R. ANDERSON.
POTATO DIGGER.
APPLICATION FILED MAY 19, 1919.

1,332,454.

Patented Mar. 2, 1920.

INVENTOR
Robert Anderson.
BY his ATTORNEY
A. M. Carlsen.

UNITED STATES PATENT OFFICE.

ROBERT ANDERSON, OF WAUSAU, WISCONSIN.

POTATO-DIGGER.

1,332,454.  Specification of Letters Patent.  Patented Mar. 2, 1920.

Application filed May 19, 1919. Serial No. 298,086.

*To all whom it may concern:*

Be it known that I, ROBERT ANDERSON, a citizen of the United States, residing at Wausau, in the county of Marathon and State of Wisconsin, have invented a new and useful Potato-Digger, of which the following is a specification.

My invention relates to potato digging machines of the kind drawn by animals or other motive power. The object is to provide a cheap simple potato digger, which those having but small farms can still afford to buy.

In the accompanying drawing:—

Figure 1:
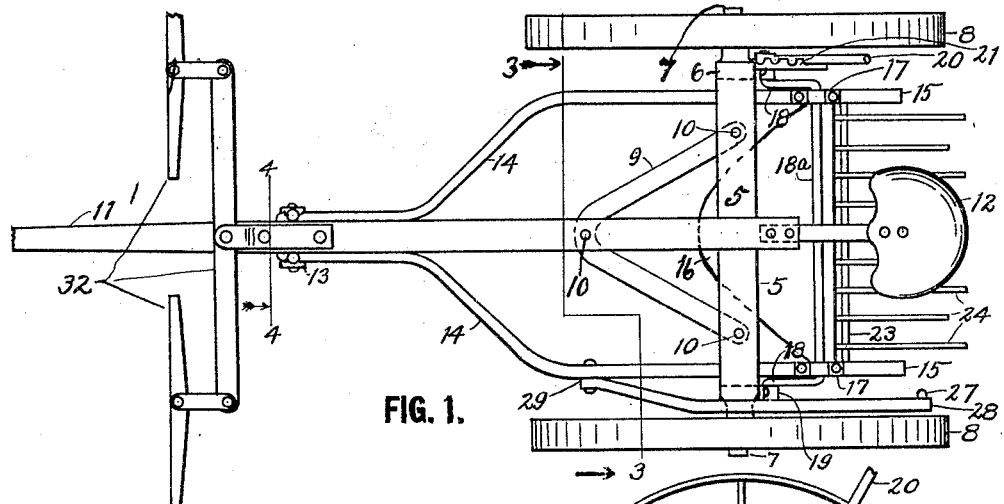
Figure 2:
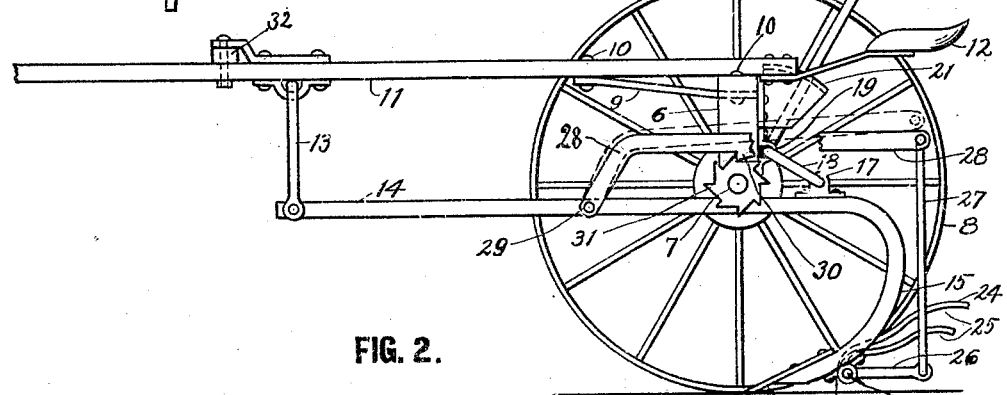
Figure 4:
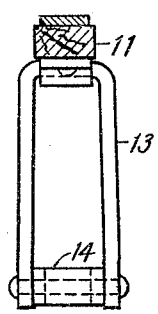
Figure 3:
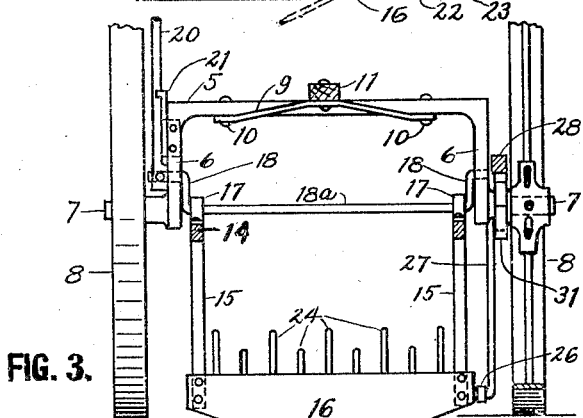

Figure 1 is a top or plan view of my improved potato digger. Fig. 2 is a side elevation of the machine with one of the ground wheels removed. Fig. 3 is a vertical section on the line 3—3 in Fig. 1 with the seat omitted. Fig. 4 is a section on the line 4—4 in Fig. 1.

Referring to the drawing by reference numerals, 5 designates a transversely disposed arched frame, in whose legs 6 are fixed axle skeins 7, which are supported by two ground wheels 8. Secured upon said frame by braces 9 and bolts 10, is a pole 11 carrying a seat 12. From the front portion of the pole is suspended by a link 13 the front end of a skeleton frame 14, the rear portion of which forms two downwardly and forwardly curved legs 15, to which the potato digging shovel 16 is fixed.

Fixed upon the frame 14 are bearings 17 in which is journaled the offset middle portion 18ª of a shaft 18, whose ends are journaled in bearings 19 fixed on the frame 5—6 and at one end of said shaft is secured a lever 20, which may be placed in either one of several notches of a notched sector 21, so as to hold the share or shovel 16 at different depths in the ground, or clear above the ground when the machine is drawn idle.

Journaled in boxes 22 on the frame legs 15 near the rear edge of the shovel 16, is a rock shaft 23, having a series of rearwardly inclined fingers or tines 24 of varied lengths and offset upwardly as at 25. One end of the shaft is provided with a rocker arm 26, which by a rod 27 is connected to the rear end of a lever 28, whose front end is pivoted at 29 to the frame 14 and near its middle it is provided with a cam or tooth 30 arranged to be raised and dropped by the teeth of a ratchet wheel 31 fixed on one of the ground wheels.

In operation draft animals are hitched to draft appliances 32, and as the machine is drawn forward and the shovel 16 is lowered into the potato field, the shovel plows up the potatoes and the earth around them, and as the mixed contents is forced rearwardly over the tines 24 and the latter are vibrated up and down, the earth becomes separated from the potatoes and drops down between the tines, and the potatoes pass over the tines and drop upon the top of the ground, from which they are afterward gathered up by shovels or sluice forks in the usual manner.

What I claim is:

1. In a potato digger, a pair of ground wheels, a transverse arched frame having skeins journaled in the hubs of said wheels, a draft pole secured upon and braced to the arched frame, an offset shaft journaled to the legs of the arched frame, a lever fixed on said shaft and means on the arched frame for holding said lever in different positions, a skeleton frame having its front end suspended by a link below the pole and its rear end journaled to the offset shaft and formed into two legs, a digging share fixed to said legs, a rock shaft near the rear edge of the share and provided with a series of rearwardly inclined tines, and means for rocking the shaft so as to vibrate the tines.

2. The structure specified in claim 1, said rocking means for the shaft comprising a rocker arm on the shaft, a ratchet wheel fixed on one of the ground wheels, a lever having a cam operated by the teeth of the ratchet wheel, one end of said lever being pivoted to the skeleton frame, and a rod connecting said lever with said rocker arm.

In testimony whereof I affix my signature.

ROBERT ANDERSON.